United States Patent
Johnson

(10) Patent No.: US 8,743,212 B2
(45) Date of Patent: Jun. 3, 2014

(54) OPTIMIZING CONTENT CALIBRATION FOR HOME THEATERS

(75) Inventor: Ronald Douglas Johnson, Westfield, IN (US)

(73) Assignee: Thomson Licensing, Boulogne-Billacourt (FR)

( * ) Notice: Subject to any disclaimer, the term of this patent is extended or adjusted under 35 U.S.C. 154(b) by 0 days.

(21) Appl. No.: 13/512,617

(22) PCT Filed: Dec. 2, 2009

(86) PCT No.: PCT/US2009/006337
§ 371 (c)(1),
(2), (4) Date: May 30, 2012

(87) PCT Pub. No.: WO2011/068490
PCT Pub. Date: Jun. 9, 2011

(65) Prior Publication Data
US 2012/0236156 A1 Sep. 20, 2012

(51) Int. Cl.
*H04N 17/00* (2006.01)
(52) U.S. Cl.
USPC .......................................... 348/181; 348/189
(58) Field of Classification Search
USPC ................. 348/722, 180–182, 189, 191–194; 702/85, 108, 117; 324/601, 612, 76.11
IPC .................................. H04N 17/00,17/02, 5/222
See application file for complete search history.

(56) References Cited

U.S. PATENT DOCUMENTS

| 6,404,456 | B1 | 6/2002 | Smith | |
|---|---|---|---|---|
| 7,999,852 | B2 * | 8/2011 | Deroo et al. | 348/189 |
| 2005/0057691 | A1 * | 3/2005 | Dean et al. | 348/552 |
| 2007/0290996 | A1 | 12/2007 | Ting | |
| 2009/0073313 | A1 | 3/2009 | Liu | |
| 2012/0127324 | A1 * | 5/2012 | Dickins et al. | 348/191 |

FOREIGN PATENT DOCUMENTS

| JP | 2004228788 | 8/2004 |
|---|---|---|
| JP | 2009-169081 | 7/2009 |
| JP | 2009267929 | 11/2009 |
| WO | WO2009134229 | 5/2009 |
| WO | WO2009078831 | 6/2009 |

OTHER PUBLICATIONS

Search Report Dated Jan. 25, 2010.

* cited by examiner

*Primary Examiner* — Sherrie Hsia
(74) *Attorney, Agent, or Firm* — Robert D. Shedd

(57) ABSTRACT

A parameter detector sends at least one test signal to a display and receives at least one detected display parameter from a remote control device in proximity of the display. A content parameter analyzer retrieves at least one content parameter from content to be sent to the display. A parameter comparator then compares the detected display parameter to the content parameter and adjusts outgoing content signals based on the content parameter but in accordance with the detected display parameter. The parameter comparator provides at least one suggested display parameter adjustment when the content parameter is beyond the detected display parameter. The suggested display parameter can be transmitted using a video and/or an audio signal.

22 Claims, 4 Drawing Sheets

OPTIMIZING CONTENT CALIBRATION FOR HOME THEATERS

This application claims the benefit, under 35 U.S.C. §365 of International Application PCT/US2009/006337, filed 2 Dec. 2009, which was published in accordance with PCT Article 21(2) on 9 Jun. 2011, in English.

TECHNICAL FIELD

The subject matter relates generally to home theaters, and more particularly to systems and methods for automatically calibrating content to experience best effort reproduction in home theaters.

BACKGROUND

Historically, a movie director or photographer captures images on film and presents them to viewers knowing the colors, film grain, contrast, gamma, etc. were accurate and reproduced the image as intended. This was done by selecting the film and either the photograph printing medium or silver screen for projection. However, as theater systems for the home have become more and more popular, the original viewing intent of the originator is lost due to the many different types of both displays and playback devices found in home entertainment systems. Thus, the original creativity that went into the content is lost when translated to the home environment. To overcome this, many attempts have been made to try to calibrate the home displays and playback devices using various test disks and the like. The process tends to be very tedious and most people try to do the calibration one time and then discontinue the process out of frustration or lack of time.

SUMMARY

The accurate display of artistic material is recreated by using calibrated sensors in a feedback path to a presentation device like a consumer set top box. Using the input from the calibrated sensors, the presentation device can adjust its output levels to reproduce the original work as intended. In one instance, an embedded imaging element and microphone are used in a remote control device as a feedback mechanism to calibrate a video and audio playback device so that the output reproduces true and accurate colors the way the original content creator intended and synchronization of the audio and video is optimized.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter can be employed, and the subject matter is intended to include all such aspects and their equivalents. Other advantages and novel features of the subject matter can become apparent from the following detailed description when considered in conjunction with the drawings.

DETAILED DESCRIPTION

Figure 1:
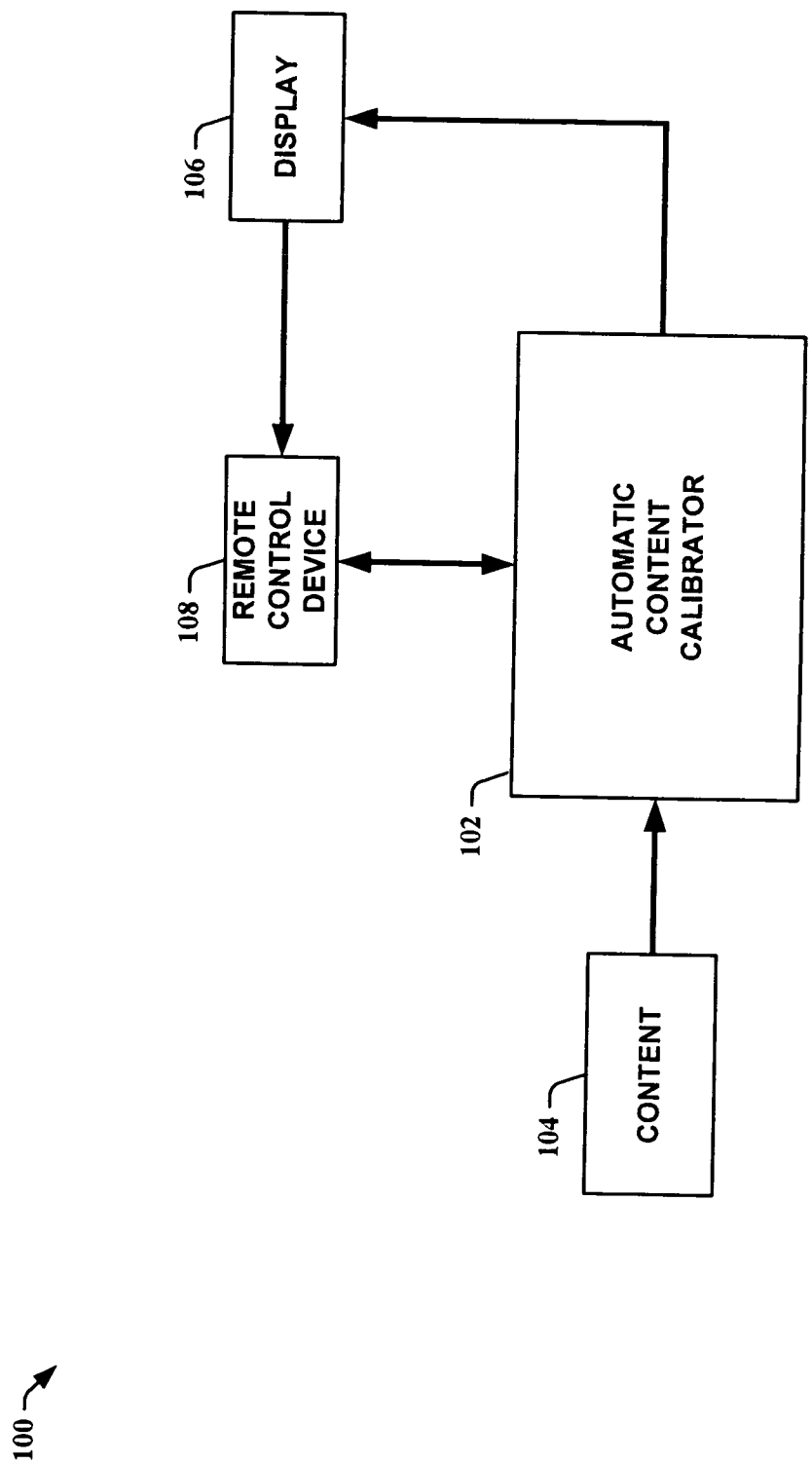
FIG. 1 is a block diagram of an automatic content calibrating system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details. In other instances, well-known structures and devices are shown in block diagram form in order to facilitate describing the embodiments.

As used in this application, the term "component" is intended to refer to hardware, software, or a combination of hardware and software in execution. For example, a component can be, but is not limited to being, a process running on a processor, a processor, an object, an executable, and/or a microchip and the like. By way of illustration, both an application running on a processor and the processor can be a component. One or more components can reside within a process and a component can be localized on one system and/or distributed between two or more systems. Functions of the various components shown in the figures can be provided through the use of dedicated hardware as well as hardware capable of executing software in association with appropriate software.

When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting instances and embodiments of the invention are intended to encompass both structural and functional equivalents. Additionally, it is intended that such equivalents include both currently known equivalents as well as equivalents developed in the future (i.e., any elements developed that perform the same function, regardless of structure).

A presentation device or other device can utilize the following to provide calibrated content to a display. A remote control device with sensors is used to provide feedback to test signals sent to the display. The feedback is then compared to parameters associated with the content to be calibrated. The content is then calibrated within the feedback parameters. If the feedback parameters do not permit optimum calibration, the content is calibrated using a best effort process as dictated by the feedback parameters. In this case, parameter changes for the display can be sent to a user to indicate that a more optimum calibration can be performed if they change certain display parameters and the like.

In FIG. 1, an automatic content calibrating system 100 with an automatic content calibrator 102 is shown. The automatic content calibrator 102 can reside within a presentation device (e.g., set top box, television, etc.) and/or in a remote location. Components of the automatic content calibrator 102 can be integrated or federated in both location and function. The automatic content calibrator 102 receives content 104 and compares parameters of the content 104 with parameters from a display 106 received via a remote control device 108. The content 104 can include, but is not limited to, video content and/or audio content and the like. The source of the content can come from, for example, a data stream, a compact disc (CD), a digital versatile disc (DVD), a portable memory device, a hard drive, a computer, and/or over the air transmission, etc.

The display 106 represents a playback system that permits a user to "experience the content 104." Thus, it 106 can include video playback devices as well as audio playback devices. Some equipment represented by display 106 can include, but is not limited to, integrated audio and video devices and also federated audio and video devices. Some manufacturers build component systems that can be linked by proprietary interface links and are included as well as systems from independent manufacturers that use industry standard interfaces (e.g., HDMI, etc.). The remote control device 108 can include, but is not limited to, remote controls for controlling displays, televisions, audio equipment, set top boxes, and the like. The remote control device 108 can also be a dedicated remote control that solely functions to provide parameters for the automatic content calibrator 102. It can also be appreciated that remote control device 108 can be a simple pushbutton remote control and/or a sophisticated home theater remote control with a display and/or voice command recognition and the like.

The automatic content calibrator 102 can retrieve parameters of the content 104 directly from the content 104 and/or indirectly via user input and/or by analyzing the content 104 itself and the like. Some content 104 contains optimal parameter settings that the originator desires so that the viewing experience is as close to the original as possible. This can be found as header information on the content 104 and/or stored as a separate file on a medium used to transport the content (e.g., on a DVD disc or sent as pre-viewing information over a data stream, etc.). The automatic content calibrator 102 can also use parameter settings based on content genre and/or content creation techniques (e.g., sports content has parameters set for 'vivid viewing,' cartoon/animation content has parameters set to maximize color performance for animation, film-based content has parameters set to maximize movie house-like experience, etc.). A default set of parameters can be used by the automatic content calibrator 102 as well. This can be based on a user's previous preferences and/or a known environment in which the playback equipment is used (e.g., dim lighting, bright lighting, rear projection television, direct view display, etc.).

The automatic content calibrator 102 uses the content parameters and detected display parameters to adjust the content output signals to the display 106. Adjustments are made based on the desired parameter settings from the content 104 and the allowable parameter settings from the remote control device 108 after testing the display 106. The display 106 is tested by sending signals to the display 106 and associated equipment and results are detected by the remote control device 108. Since the automatic content calibrator 102 does not necessarily have direct control over the display 106, it 102 adjusts the desired parameters from the content 104 until they are optimized but within the detected parameters of the display 106. If the desired parameters are beyond the detected parameters, the automatic content calibrator 102 can send suggested parameter changes to the display 106, the remote control device 108, and/or any other means available (e.g., to a mobile device, computer, etc.). The suggested parameter changes can be sent for visual interpretation and/or aural interpretation and can include, but is not limited to, visual parameter changes and/or audio parameter changes and the like.

Figure 2:
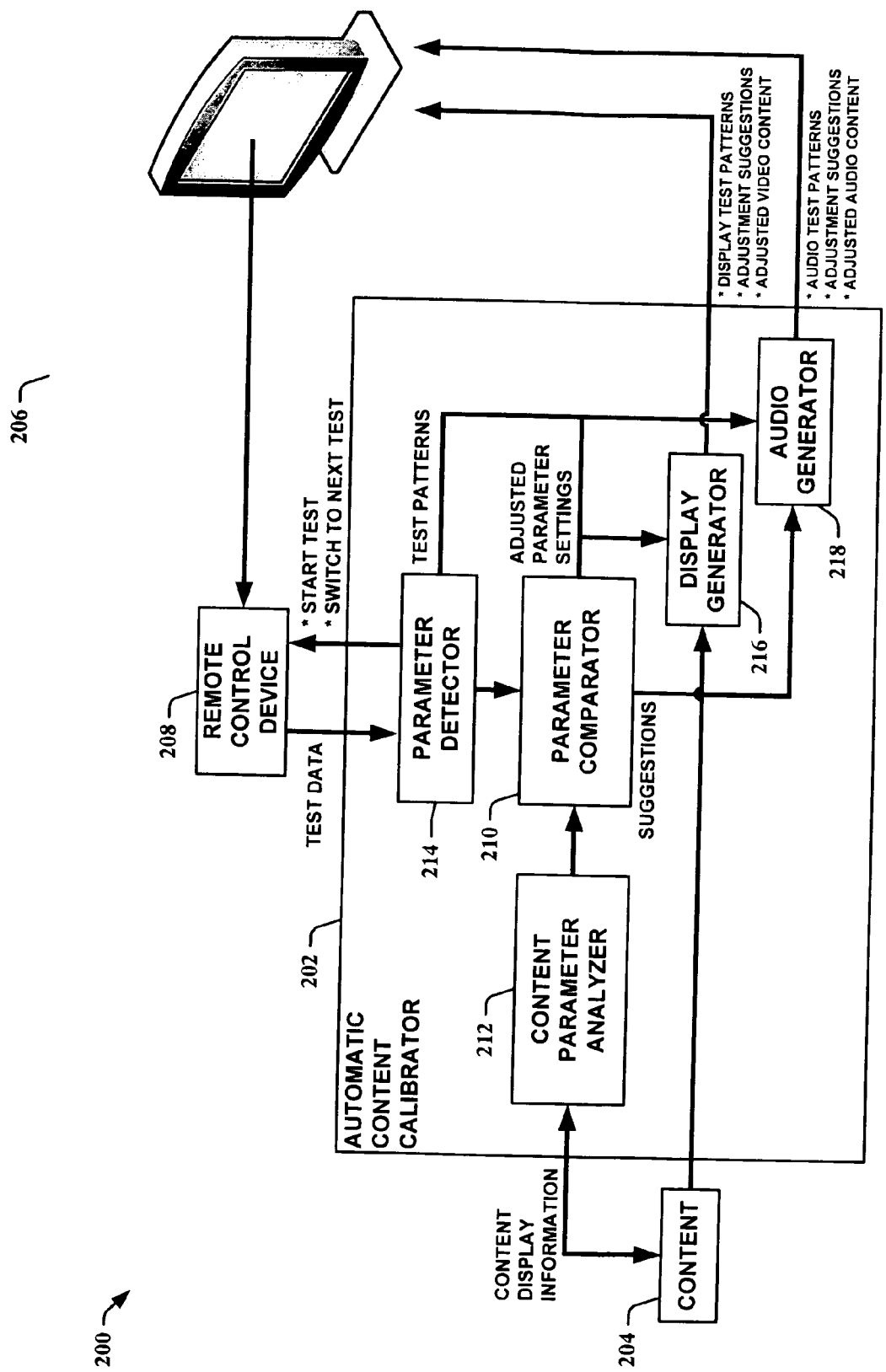
FIG. 2 is another block diagram of an automatic content calibrating system in accordance with an aspect of an embodiment.

Referring to FIG. 2, an automatic content calibrating system 200 with an automatic content calibrator 202 is depicted. The automatic content calibrator 202 receives content 204 and compares parameters of the content 204 with parameters from a display 206 received via a remote control device 208. In this example, the automatic content calibrator 202 uses a content parameter analyzer 212 to determine content parameters, a parameter detector 214 to detect display 206 parameters, and a parameter comparator 210 to compare content or desired parameters with detected display parameters. A display generator 216 and an audio generator 218 are shown to facilitate in understanding the interaction of the components of the automatic content calibrator 202 and are not required for implementation of this example.

The content parameter analyzer 212 determines desirable content parameters for the content 204. As mentioned above, the content parameters can be obtained directly and/or indirectly from the content 204. Thus, the content parameter analyzer 212 can resort to a simple default parameter set for the content 204 and/or base it on a default parameter set based on the genre, etc. of the content 204. The content parameter analyzer 212 can also be sophisticated and perform testing on segments of the content 204 to determine correct parameter settings as well. The content parameter analyzer 212 can also obtain settings directly from the content 204 through content header information, pre-information sent before viewing, and/or information stored as an associated file and the like. Once determined through analysis and/or default, the content parameter analyzer 212 sends the desired parameters to the parameter comparator 210.

The parameter detector 214 detects ranges and settings of parameters associated with the display 206. This can be accomplished by sending test pattern signals and/or audio signals and the like to the display 206. In this example, the parameter detector 214 sends the signals via the display generator 216 and/or the audio generator 218. From there, the signals are sent to the display 206 and/or associated equipment (e.g., stereo system, etc.). Further details of examples of the test signals are given below (see FIG. 4, etc.). The remote control device 208 has sensors that can detect the test signals sent by the parameter detector 214. The remote control device 208 is typically placed in proximity with the display 206 during the testing of the display 206. An optical sensor in the remote control device 208 interprets visual test patterns and/or a microphone, etc. in the remote control device 208 interprets audible test patterns. The remote control device 208 does not necessarily have to have both types of sensors and can have other types of sensors as well. Various degrees of sensitivity of the sensors in the remote control device 208 can allow some implementations that do not necessitate extreme proximity for devices used in low light conditions, etc.

In one instance, the parameter detector 214 and the remote control device 208 communicate in a one way manner. However, in other instances, the remote control device 208 and the parameter detector 214 communicate in a two-way manner. Two-way communication allows not only for detected parameters to be sent from the remote control device 208 to the parameter detector 214, but also for the parameter detector 214 to acknowledge receipt of the information and to inform the remote control device 208 that a test was completed, etc and to prepare for the next test, etc. Since the parameter detector 214 can automatically step through tests in a short amount of time (e.g., a few seconds), the process can be made faster by having the remote control device 208 acknowledge when a test has been received and a detected parameter is passed. The speed and accuracy can also be increased if the remote control device 208 has apriori knowledge of what test is next and the like (e.g., it can better prepare or switch to a different sensor—switch from an optical sensor to an audio sensor, etc.). Once the parameter detector 214 has received a detected parameter, it can pass the detected parameter to the parameter comparator 210. The parameter detector 214 can also wait until all testing is completed before passing detected parameters to the parameter comparator 210. The parameter detector 214 can also initiate the calibration testing and put the remote control device 208 in a test mode.

The parameter comparator 210 compares the desired parameters from the content parameter analyzer 212 with the detected parameters from the parameter detector 214. The parameter comparator 210 looks to see if the desired parameters are within the detected capabilities of the display 206 and associated equipment (e.g., audio equipment). For example, if the desired brightness level from the content 204 is above the brightness clipping level of the display 206, the parameter comparator 210 decreases the desired brightness level to comply with the reduced performance of the display 206. Similarly, if the detected parameters indicate that de-interlacing is being performed in the display 206, the parameter comparator 210 sets a desired de-interlacing parameter to OFF to avoid double de-interlacing of the content 204 (e.g. de-interlacing by a presentation device and then the signal is de-interlaced again in a display). The parameter comparator 210 can also avoid double sharpening and other double applications of processes that are meant to enhance content but were not intended to be applied more than once to the content. Similarly, if it is detected that de-interlacing is not accomplished in the display 206, additional de-interlacing processes can be applied before the content signal is sent to the display 206. In this example, the parameter comparator 210 controls a content output signal to the display 206 by adjusting the content's output signal via the display generator 216 and the audio generator 218.

As can be expected, especially with content created using multi-million dollar equipment, a user's home equipment may not be able to accurately reproduce content as it was intended by the original author. But it is also possible, that a user has the ability to make adjustments to their equipment to aid in increasing the fidelity of the viewing experience—if they only knew what to change. In these cases, the parameter comparator 210 can provide suggestions to a viewer to further enhance their viewing experience. For example, if a desired black level is higher than a display's detected black level, the parameter comparator 210 can send a suggestion to a viewer to increase their display's black level for higher playback performance. This greatly simplifies the process from a user's perspective as most parameters are intertwined—adjusting one typically affects another parameter or parameters. Thus, the suggestion can be to increase the black level and then re-run the calibration process and the parameter comparator 210 can then alter the related parameters to give an even higher level of playback performance without further interaction by the user.

Figure 3:
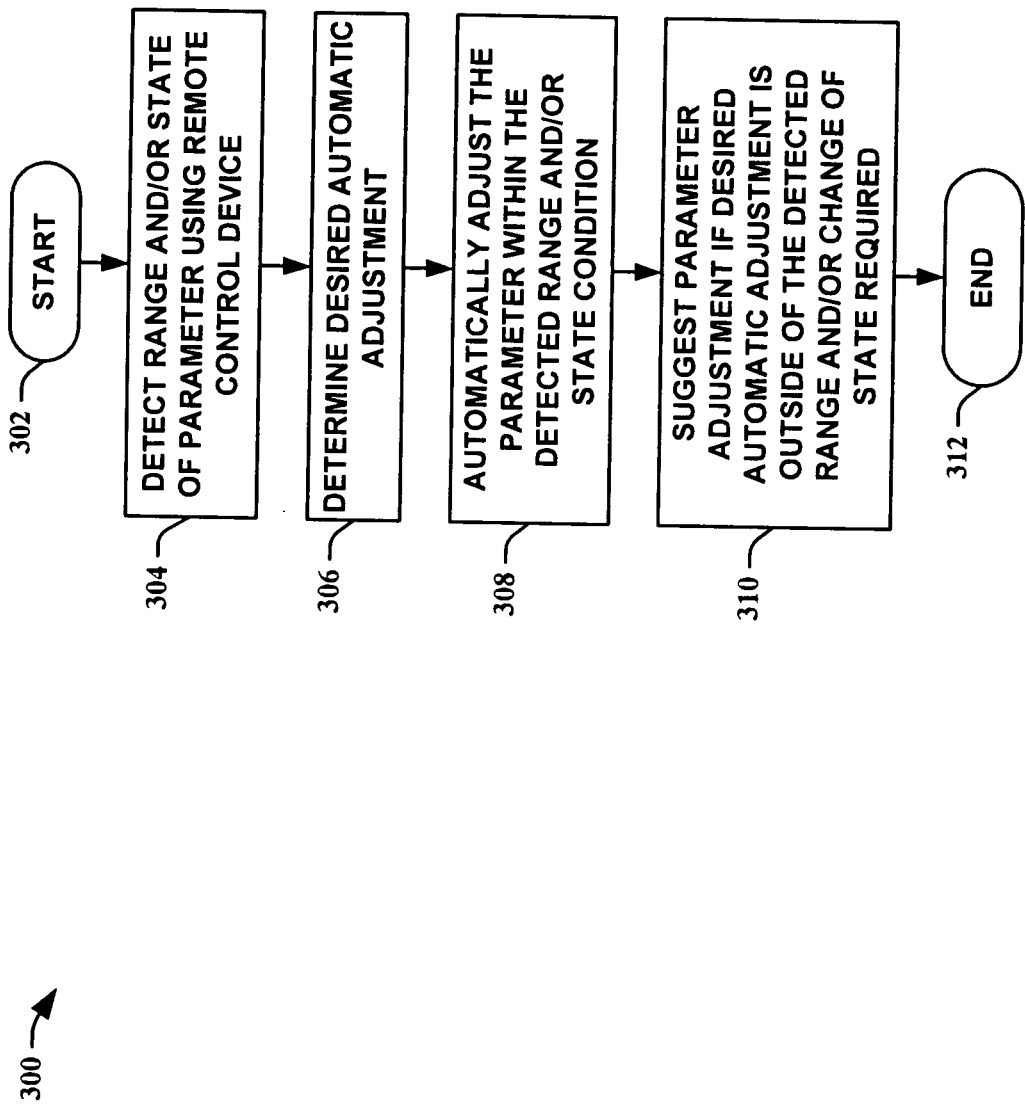
FIG. 3 is a flow diagram of a method of automatically calibrating content in accordance with an aspect of an embodiment.
Figure 4:
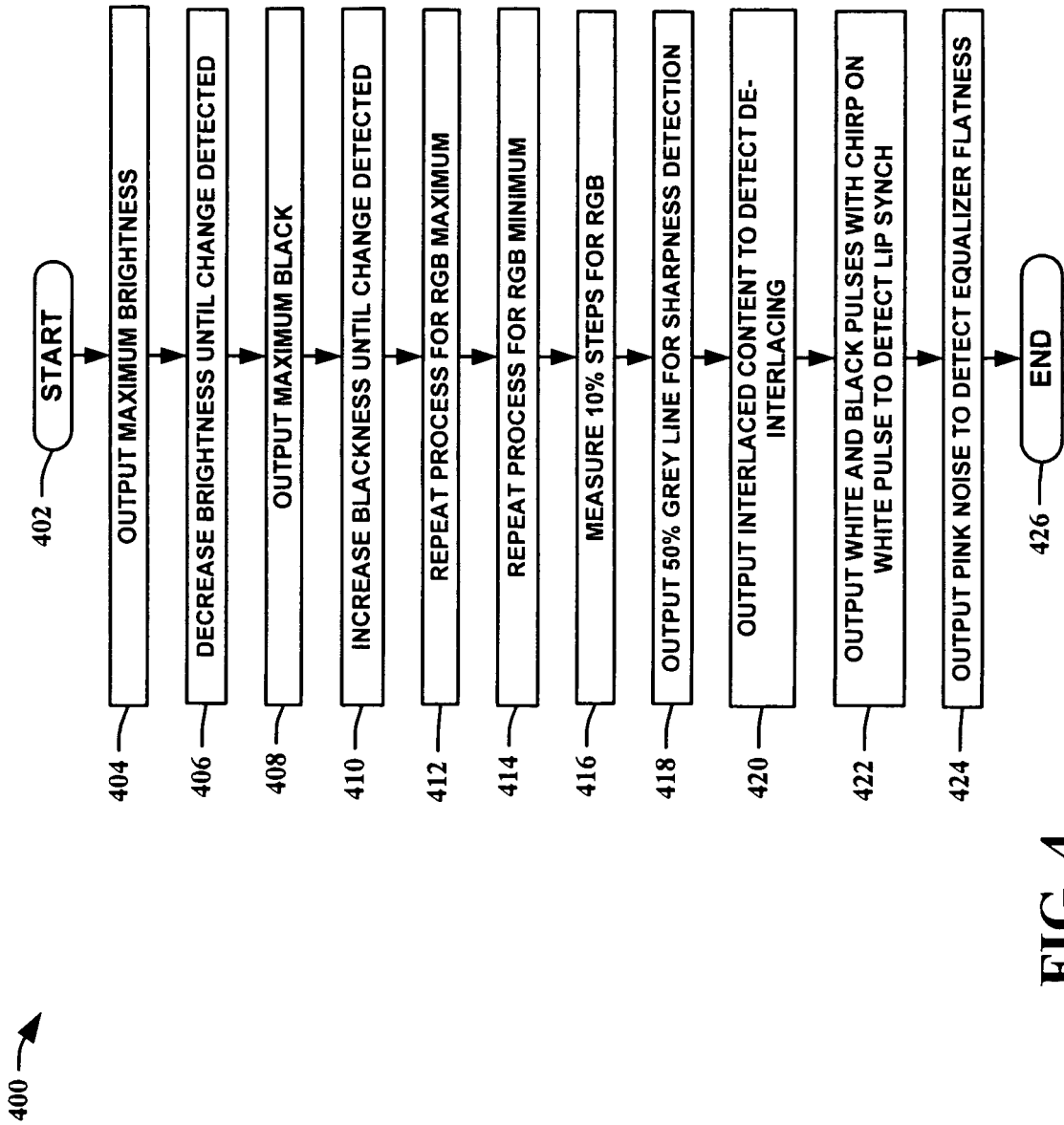
FIG. 4 is another flow diagram of a method of automatically calibrating content in accordance with an aspect of an embodiment.

In view of the exemplary systems shown and described above, methodologies that can be implemented in accordance with the embodiments will be better appreciated with reference to the flow charts of FIGS. 3-4. While, for purposes of simplicity of explanation, the methodologies are shown and described as a series of blocks, it is to be understood and appreciated that the embodiments are not limited by the order of the blocks, as some blocks can, in accordance with an embodiment, occur in different orders and/or concurrently with other blocks from that shown and described herein. Moreover, not all illustrated blocks may be required to implement the methodologies in accordance with the embodiments.

Looking at FIG. 3, a flow diagram of a method 300 of automatically calibrating content in accordance with an aspect of an embodiment is illustrated. The method starts 302 by detecting range and/or state of a parameter using a remote control device 304. One and/or two-way communication means can be used to communicate with the remote control device. Most display and/or audio devices are limited in their playback capabilities. By detecting valid ranges and/or states of a parameter (e.g., ON or OFF, high or low, etc.), content can be adjusted to allow a more optimum performance to be achieved with a given set of playback devices. A desired automatic adjustment is then determined 306. Content that is to be played back can be analyzed to determine desirable parameters. Some content includes information that can be used directly while other content may need to be further analyzed to determine proper settings to gain the best content viewing experience. A default 'best experience' can also be used that makes a full range of all parameters and/or some other optimized parameter settings the "desirable parameters." The parameter is then automatically adjusted within the detected range and/or state condition 308.

A comparison can be made between the desirable parameters and the detected or allowable adjustments. The desirable parameters are then adjusted to conform to the information that has been detected. This allows the best content viewing experience within the limitations set by the playback devices without user intervention. A parameter adjustment is then suggested if the desired automatic adjustment is outside of the detected range and/or a change of state is required 310, ending the flow 312. By providing feedback to a user, a better viewing experience can be obtained. The feedback or suggestions can be done visually and/or aurally via the playback devices themselves and/or other devices available to disseminate information to the user (e.g., over the Internet, via a handheld mobile device, on a remote control screen, etc.). For example, the suggestions can be general such as "please increase the audio volume" to very specific suggestions such as "please increase the black level by 9" and the like. Thus, a user could see the phrases on their display and/or it could be announced over audio playback devices associated with the viewing experience. A combination of both audio and visual suggestions can be accomplished as well.

Turning to FIG. 4, another flow diagram of a method 400 of automatically calibrating content in accordance with an aspect of an embodiment is shown. In one instance, the following method can be employed in a presentation device such as a set top box and the like in conjunction with a remote control device. Communication between the presentation device and the remote control device can be two-way communication such as, for example, a Zigbee RF (radio frequency) connection and the like that allows handshaking and transferring of data to and from the presentation device. In one scenario, a calibration sequence is initiated and a remote control device is held in proximity of a display as the following method 400 is implemented. This allows acquisition of detected parameters that, for example, a presentation device can use to adjust content output signals. In some instances, a focus check can be performed at the start of the following method 400 to ensure that a remote control device is close enough to perform the testing properly. An indication, audible and/or visual, can then be used to notify the user to adjust the proximity of the remote control device to a display (e.g., "Please place the device closer to the screen" or "Please place the device farther from the screen," etc.).

The method 400 starts 402 by outputting a maximum brightness level signal to a display 404. Although a maximum brightness level signal is sent, it is likely that a display device may not be capable of displaying the full brightness.

Brightness level is also known as 'white level.' The brightness. is then decreased until a change is detected 406. This detected level is used for a maximum white level of the display and allows the output signal level to be set out of the range where white (brightness) levels are clipped and can be used to calibrate the brightness output levels required. A maximum black level signal is then output to a display 408. Black level is also known as 'contrast' and is used to adjust the darkness of the display. The black level is then increased until a change is detected 410. This detected level is used for maximum black level of the display and allows the output signal level to be set out of the range where black levels are clipped and can also be used to calibrate the contrast settings of the display.

A similar process is then used to detect maximum levels for red/green/blue (RGB) colors 412. In other words, a maximum level, for example a maximum green level signal, is sent to the display and is reduced until a change is detected. A similar process is then also used to detect minimum levels for red/green/blue (RGB) colors 414. In other words, a minimum level, for example a minimum green level signal, is sent to the display and is increased until a change is detected. RGB is then measured in approximately 10% steps 416. The presentation device can now take measurements for approximately 10% changes in red, green and blue between the detected minimum and detected maximum signal levels for the display. One skilled in the art can appreciate that other steps (e.g., 1%, 25%, etc) can also be used. Obviously, the smaller the percentage step, the greater the resolution but the more time required to complete the testing. Likewise, a larger percentage step makes testing quicker but with less resolution. These detected signal levels are used to calculate the display's gamma, a non-linear curve that is used to linearize the output levels.

An approximately 50% grey line signal is then output for sharpness detection 418. The solid approximately 50% grey line signal is typically displayed on a white background. If the display's content signal output path doesn't have a sharpening filter, only the approximately 50% grey line signal is detected. If the display's content signal output path has a sharpening filter, a darkened line is detected between the white and grey. This detection is used to ensure that a sharpening filter isn't used both in the presentation device and on the display. Sharpening video signals twice leads to artifacts. For example, sharpening usually has a "ring" to it. The grey line gets darker and the whites on pixel wide lines on both sides will get brighter—increasing the perceived sharpness. Sharpening twice will increase the number of rings causing a loss of detail since it will perform this same step now to all three of the different lines (the original grey and the two brighter whites) leading to five new lines.

Interlaced content is then output to detect de-interlacing 420. Typically, an interlaced image of a solid object is moved from right to left on the display. If the interlaced signal is presented with thin horizontal lines along the leading edge of the lines, the display is not de-interlacing content. The presentation device can then set itself to perform de-interlacing when the input content is interlaced. This allows the presentation device to avoid running the content through two different de-interlacing filters as this degrades the content and makes it softer.

White and black pulses are output with an audible signal when the white is pulsed to detect lip synchronization 422. Typically, at the moment of the white pulse a high frequency chirp can be played on audio playback devices associated with the display. This facilitates in calibrating the lip synchronization of the display and playback system associated with it. The audio and video of the content material quite often goes to different devices for playback. Both the audio and video devices are generally built with user programmable delays to synchronize the audio and video. By detecting the delay, the presentation device can compensate for the delay in its content output signals. A pink noise signal is then output to detect an audible frequency range 424, ending the flow 426. Pink noise audio helps to detect equalizer flatness of an audio playback device associated with the display. All frequencies are played at once and a fast Fourier transform is then used to detect the flatness of the response across all audio frequencies. The presentation device and then use the detected signals to compensate the content output signal to produce a flatter audio signal response.

One skilled in the art can appreciate that not all of the above steps of the method 400 need to be completed to enhance a viewing experience. The steps can be performed singly, partially, and/or in unison and some can be iterative in nature to produce an optimum result. Iterations can be performed on the individual tests and/or as a complete cycling of more than one test to find the result. It can be appreciated that while some steps are sequential in nature, others can be performed in parallel. For example, while a display's screen is being tested for video playback, an audio signal can be tested for audio playback at generally the same time. Similarly, a combined test pattern used for video testing can test several video parameters at one time.

The detected signal levels gained from these and other methods allow a presentation device to enhance a user's content viewing experience without requiring the user to have intimate knowledge of how to input settings on their playback equipment. Instances described herein also allow suggestions to be transmitted to a user to allow the user to make adjustments to further enhance the content viewing experience. These types of suggestions can include, but is not limited to, adjusting black levels, brightness levels, audio equalization, etc. The adjustments can allow a better range of a parameter that better suits a given content.

It is to be appreciated that the systems and/or methods of the embodiments can be utilized in content viewing facilitating computer components and non-computer related components alike. Some content viewing and/or processing can be fully and/or partially implemented in software. Further, those skilled in the art will recognize that the systems and/or methods of the embodiments are employable in a vast array of electronic related technologies, including, but not limited to, computers, set top boxes, and/or handheld electronic devices, and the like.

What has been described above includes examples of the embodiments. It is, of course, not possible to describe every conceivable combination of components or methodologies for purposes of describing the embodiments, but one of ordinary skill in the art can recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system, comprising:
a parameter detector that sends at least one test signal to a display and receives at least one detected display parameter from a remote control device in proximity of the display;
a content parameter analyzer that retrieves at least one content parameter from content to be sent to the display; and
a parameter comparator that compares the detected display parameter to the content parameter and adjusts outgoing content signals based on the content parameter but in accordance with the detected display parameter;
wherein the parameter detector is adapted for two-way communication with the remote control device, the two-way communication being independent of the display.

2. The system of claim 1, wherein the parameter comparator provides at least one suggested display parameter adjustment when the content parameter is beyond the detected display parameter.

3. The system of claim 2, wherein the suggested display parameter adjustment is transmitted as at least one of a video signal and an audio signal.

4. The system of claim 1, wherein the parameter detector initiates the test signal at the request of a user.

5. A set top box employing the system of claim 1.

6. The system of claim 1, wherein the remote control device is held in close proximity of a display screen.

7. The system of claim 1, wherein the parameter detector is adapted to use the two-way communication with the remote control device to acknowledge receipt of the at least one detected display parameter, to inform the remote control device of testing status, or to prepare the remote control device for a subsequent test.

8. The system of claim 1, wherein the parameter detector automatically initiates a series of test signals when prompted.

9. The system of claim 8, wherein the parameter detector confirms detection of a parameter from the remote control device before sending a subsequent test signal.

10. A system, comprising:
a parameter detector that sends at least one test signal to a display and receives at least one detected display parameter from a remote control device in proximity of the display;
a content parameter analyzer that retrieves at least one content parameter from content to be sent to the display; and
a parameter comparator that compares the detected display parameter to the content parameter and adjusts outgoing content signals based on the content parameter but in accordance with the detected display parameter;
wherein the at least one test signal comprises at least one of a sharpness associated signal and a de-interlacing associated signal, and wherein the parameter comparator adjusts outgoing content signals to correspondingly avoid de-interlacing content twice or sharpening content twice.

11. A method, comprising:
sending at least one parameter test signal to a display;
receiving at least one detected display parameter from a remote control device in proximity of the display;
sending two-way communication from a parameter detector to the remote control device, the two-way communication being sent independently of the display;
retrieving at least one content parameter from content to be sent to the display;
comparing the detected display parameter to the content parameter; and
adjusting outgoing content signals based on the content parameter but in accordance with the detected display parameter.

12. The method of claim 11 further comprising:
suggesting at least one display parameter adjustment when the content parameter is not compatible with the detected display parameter.

13. The method of claim 12 further comprising:
transmitting a suggested display parameter adjustment as at least one of a video signal and an audio signal.

14. The method of claim 11 further comprising:
initiating the test signal at the request of a user.

15. A set top box employing the method of claim 11.

16. The method of claim 11 further comprising:
locating the remote control device in close proximity of a display screen.

17. The method of claim 11 further comprising:
transferring parameter information using two-way communication with the remote control device.

18. The method of claim 11 further comprising:
automatically initiating a series of test signals when prompted.

19. The method of claim 18 further comprising:
confirming detection of a parameter from the remote control device before sending a subsequent test signal.

20. A non-transitory computer readable medium having stored thereon computer executable components which, when executed by a computer, perform the method of claim 11.

21. A method, comprising:
sending at least one parameter test signal to a display;
receiving at least one detected display parameter from a remote control device in proximity of the display;
retrieving at least one content parameter from content to be sent to the display;
comparing the detected display parameter to the content parameter; and
adjusting outgoing content signals based on the content parameter but in accordance with the detected display parameter;
wherein the test signal comprises at least one of a sharpness associated signal and a de-interlacing associated signal; and
wherein adjusting outgoing content signals correspondingly avoids de-interlacing content twice or sharpening content twice.

22. A system, comprising:
means for sending at least one parameter test signal to a display;
means for receiving at least one detected display parameter from a remote control device in proximity of the display;
means for sending two-way communication from a parameter detector to the remote control device, the two-way communication being sent independently of the display;
means for retrieving at least one content parameter from content to be sent to the display;

means for comparing the detected display parameter to the content parameter; and means for adjusting outgoing content signals based on the content parameter but in accordance with the detected display parameter.

\* \* \* \* \*